(12) United States Patent
Lincoln et al.

(10) Patent No.: US 11,550,640 B2
(45) Date of Patent: *Jan. 10, 2023

(54) ANALYSIS OF APPLICATION PROGRAMMING INTERFACE USAGE FOR IMPROVING A COMPUTER SYSTEM

(71) Applicant: International Business Machines Corporation, Armonk, NY (US)

(72) Inventors: Nicholas K. Lincoln, Hampshire (GB); Josephine D. Messa, Hampshire (GB); Simon D. Stone, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 283 days.

This patent is subject to a terminal disclaimer.

(21) Appl. No.: 16/389,096

(22) Filed: Apr. 19, 2019

(65) Prior Publication Data
US 2019/0243692 A1    Aug. 8, 2019

Related U.S. Application Data (63) Continuation of application No. 15/409,663, filed on Jan. 19, 2017, now Pat. No. 10,360,082.

(51) Int. Cl.
G06F 9/54    (2006.01)
(52) U.S. Cl.
CPC .................................. G06F 9/541 (2013.01)
(58) Field of Classification Search
None
See application file for complete search history.

(56) References Cited

U.S. PATENT DOCUMENTS

| 9,300,759 | B1 | 3/2016 | Jorgensen |
| 2005/0204391 | A1 | 9/2005 | Hunleth et al. |
| 2007/0294662 | A1* | 12/2007 | Kim ...................... B25J 9/1661 717/107 |
| 2009/0138898 | A1 | 5/2009 | Grechanik et al. |

(Continued)

OTHER PUBLICATIONS

Acharya et al., Mining API Patterns as Partial Orders From Source Code: From Usage Scenarios To Specifications, URL:http://static.googleusercontent.com/media/research.google.com/en//pubs/archive/33336.pdf, ESEC/FSE, Sep. 3-7, 2007, 9 pages.

(Continued)

*Primary Examiner* — Chat C Do
*Assistant Examiner* — William C Wood
(74) *Attorney, Agent, or Firm* — Schmeiser, Olsen & Watts, LLP; Rakesh Roy (57) ABSTRACT

A method and system. Application programming interface (API) call data is analyzed for a user to identify a relationship between API input data and API output data of two or more API calls. API usage information is generated by utilizing a dependency between the two or more API calls. The API usage information includes information pertaining to how data flows between the two or more API calls. API provision is improved with respect to execution of a process, based on utilization of the API usage information. Improving API provision includes: receiving a specification of an improvement to be achieved for the process, selecting at least two APIs from the two or more APIs for achieving the improvement, generating a new API that combines the at least two APIs, and modifying the process by including the new API in the process and removing the at least two APIs from the process.

20 Claims, 5 Drawing Sheets

(56) References Cited

U.S. PATENT DOCUMENTS

| | | | |
|---|---|---|---|
| 2011/0099159 A1* | 4/2011 | Trevor | G06F 16/958 707/709 |
| 2012/0159570 A1 | 6/2012 | Rierson et al. | |
| 2012/0166597 A1 | 6/2012 | Babey et al. | |
| 2014/0208296 A1* | 7/2014 | Dang | G06F 8/75 717/123 |
| 2015/0082441 A1 | 3/2015 | Gathala et al. | |
| 2015/0095923 A1 | 4/2015 | Sarid | |
| 2016/0019102 A1 | 1/2016 | Cui et al. | |
| 2017/0091001 A1 | 3/2017 | Pandey et al. | |
| 2018/0203746 A1 | 7/2018 | Lincoln et al. | |

OTHER PUBLICATIONS

Valeh H. Nasser, The Central Role of APIs in Mashup and Cloud Platforms and Need for an Agile API Development Method, URL: http://pages.cpsc.ucalgary.ca/~vnasser/pub/valeh_agilecloud_report.pdf, 6 pages.

Uddin, et al., Analyzing Temporal API Usage Patterns, URL: http://www.cs.mcgill.ca/~martin/papers/ase2011.pdf, 4 pages.

ip.com, Highlighting missing information or non-deal web experiences via hyperlink chain analysis, IP.com No. IPCOM000236210D, IP.com Electronic Publication Date: Apr. 11, 2014, 4 pages.

Office Action (dated Feb. 16, 2018) for U.S. Appl. No. 15/409,663, filed Jan. 19, 2017.

Amendment (dated May 11, 2018) for U.S. Appl. No. 15/409,663, filed Jan. 19, 2017.

Office Action (dated Oct. 16, 2018) for U.S. Appl. No. 15/409,663, filed Jan. 19, 2017.

Amendment (dated Jan. 16, 2019) for U.S. Appl. No. 15/409,663, filed Jan. 19, 2017.

Notice of Allowance (dated Mar. 8, 2019) for U.S. Appl. No. 15/409,663, filed Jan. 19, 2017.

\* cited by examiner

ANALYSIS OF APPLICATION PROGRAMMING INTERFACE USAGE FOR IMPROVING A COMPUTER SYSTEM

This application is a continuation application claiming priority to Ser. No. 15/409,663, filed Jan. 19, 2017, now U.S. Pat. No. 10,360,082 issued Jul. 23, 2019.

TECHNICAL FIELD

The present invention relates to Application Programming Interfaces (APIs), and more particularly to analyzing API usage for improving a computer system.

BACKGROUND

In computer programming, an application programming interface (API) is a set of routines, protocols, and tools for building software applications and services. An API expresses a software component in terms of the software component's operations, inputs, outputs, and underlying types.

A software component (e.g., an application, service or library) may provide an API, and methods defined by that API can be called (for example, from an application) in order to interact with the software component.

Recently, a trend in the area of API development has been to move towards a microservice architecture comprising small, decoupled applications that have a very specific purpose or function. An example of a microservice architecture is a customer database microservice which contains API methods that can be used to get/modify/delete existing customers and add new customers to the customer database. A more extreme example of a microservice is a lookup service that comprises a single method which takes a two letter country code and returns the full country name.

Typically, a developer of a single application will arrange the single application to call multiple API methods provided by multiple APIs. It is also likely that the developer will arrange the single application to use data returned by one API method to call another API method (that can potentially be in another API). For example, a developer may wish to retrieve and enrich a customer record in a database with the full country name of a country and currency in that country, before displaying a retrieved customer record to an end user. This would result in a sequence of linked API calls, such as:

(i) Take Customer ID call GetCustomer( ) in API #1->returns customer record (ii) Extract country code from customer record->call CountryCodeToCountryName( ) in API #2->returns country name (ii) Take country name call GetCountryCurrency( ) in API #3->returns currency name There are typically costs associated with making an API call (e.g., use of CPU processing time, network bandwidth, communication time, etc.). There may also be a "setup" cost associated with making an API call (e.g., calling a method in a REST API requires that an Hypertext Transfer Protocol (HTTP) connection is established across a network before the API method can be invoked). These costs can be incurred by both the consumer and provider of the called API.

There may also be the development cost associated with developing a sequence of linked API calls.

SUMMARY

Embodiments of the present invention provide a method and an associated computer program product and computer system. One or more processors obtain API call data for a user, said API call data for the user comprising for each API call of a plurality of API calls made by the user: API request data and API response data. The one or more processors analyze the API call data for the user to identify a relationship between API request data and API response data of different API calls. The one or more processors determine a dependency, between two or more API calls of the plurality of API calls, based on the identified relationship.

BRIEF DESCRIPTION OF THE DRAWINGS

Embodiments of the present invention will now be described, by way of example only, with reference to the following drawings.

DETAILED DESCRIPTION

It should be understood that the Figures are merely schematic and are not drawn to scale. It should also be understood that the same reference numerals are used throughout the Figures to indicate the same or similar parts.

The present invention provides a method for an analyzing Application Programming Interface (API) usage that may provide useful information regarding dependency between APIs. Such information may provide improved understanding of how existing APIs are being used and/or enable improvements and extensions to be made to existing APIs. Such information may also enable the identification of opportunities to provide new APIS that combine other APIs.

The present invention provides a computer program product including computer program code for implementing methods of the present invention when the program code is executed on a processor.

The present invention yet provides a system (such as a processing device and/or network component) configured to execute this computer program code.

According to an embodiment of the present invention there is provided computer-implemented method for analyzing application program interface (API) usage. The method comprises: (i) obtaining API call data for a user, the API call data comprising for each API call of a plurality of API calls made by the user: API request data; and API response data; (ii) analyzing the API call data to identify a relationship between API request data and API response data of different API calls; and (iii) determining a dependency between API calls based on the identified relationship.

The present invention analyzes data in different API calls to see if and how API calls (from the same or different APIs) may be linked. Where relationships between API calls are identified, a dependency between the calls may be determined, for example by identifying how data of an API request of a API call may be related to data of an API response provided by an earlier (e.g., preceding) API call. Put another way, the analysis may identify data that is extracted from the output of an API call and then used as the input of another API call. In this way, relationships and dependencies between API calls may be exposed, thus providing for potential improvements and/or changes to be implemented which capitalize identified dependencies or data flow(s) between APIs. Improved or optimized interaction or inter-operability of APIs may therefore be enabled by embodiments of the present invention.

Thus, the present invention provides a method which may provide information about dependencies between APIs and/or API calls. Such information may enable an API provider or developer to understand how consumers are using the APIs. This understanding may be used to identify the potential to provide to provide new APIs (which may combine other APIs for example) and also to assist in the development process. For instance, embodiments may provide information which can be used to generate a re-usable software library that provides a single API which is configured to call the other APIs. By way of further example, embodiments may provide information which assists in the generation of example code showing how to combine multiple APIs in order to achieve a goal or meet a predetermined constraint.

The present invention may determine one or more dependencies between API calls by identifying where and how data of an API response is used in a subsequent API request. Such data may, for example, be intercepted by a component which sits between an API provider and API consumer. In other examples, from data of calls made to APIs, a consumer may be recorded, and such recording may be performed by the API consumer or by the API provider. For instance, for a REST API, a HTTP gate or proxy may be used to intercept HTTP traffic between an API provider and consumer.

Embodiments may identify any correlations between the output (e.g., response) data of one API resource and the input (e.g., request) data of another API resource, even if the API resources are across multiple domains. This identification may be thought of as a data/content inspection and correlation which looks across API calls to identify parts of data from an API response that are used to form a request to another API call. By identifying a data flow between API calls, one may build an understanding (such as a skeleton API composition) of how the APIs are linked and how data is mapped from response to a subsequent request. In this way, a user may only need to provide data which is unique to each API call.

In an embodiment, the step of analyzing may comprise: determining if request data of an API call is based on response data of a preceding API call; and identifying a relationship between API request data of the API call and API response data of the preceding API call based on the result of the determination. Such embodiments not only enable a data-centric approach to API flow analysis, but also enable improved insight into the manner in which data is used in an API flow.

Also, the step of determining if request data of an API call is based on response data of a preceding API call may comprise: determining if request data of an API call comprises at least one of: an aggregation; a subset; a concatenation; a conversion; a translation; and a transformation of response data of a preceding API call. Thus, embodiments may identify cases where an API consumer has used data received from one API call for another API call. Embodiments may further identify how the data has been used, for example by identifying if data has been transformed in some way. By way of example, it may be determined if a user has applied basic string operations to fields in a response from one API call, such as converting field data to lower or upper case, before passing the modified fields in a request of another API call. In another example, an embodiment may identify instances where a user has concatenated two or more fields from one API call, such as combining the "first name" and "last name" fields into a single "full name field", before passing the combined field a request of another API call. By analyzing request and response data of a sequence of API calls, an embodiment may therefore identify cases where the API consumer is using response data from API calls and combining data from those calls into a request for another API call. It may also be identified where response data from one API call determines which API call is subsequently invoked.

The step of obtaining API call data for a user may comprise: intercepting API traffic between an API consumer and an API provider, the API consumer being controlled by the user to make the plurality of API calls. The present invention therefore monitors API data in an invisible manner, wherein data of API traffic is copied or mirrored for analysis without the API traffic being modified or changed. Embodiments may therefore act in a transparent manner.

For example, the step of obtaining API call data for a user may comprise: reading API call data from the intercepted API traffic; storing the read API call data in a data store; and forwarding the intercepted API traffic to the intercepted API traffic's intended destination. Embodiments may therefore provide for API usage analysis in a manner which is not visible to a consumer and/or provider.

The step of intercepting API traffic may be undertaken at either the API consumer or the API provider, which may remove the need for additional, separate nodes, devices or systems to be implemented. Alternatively, or additionally, the step of intercepting API traffic may be undertaken as location between the API consumer or the API provided, such as at an intermediary for example. An intercepting node may thus be added to conventional systems so as to implement embodiments. Embodiments may thus be made backwards-compatible with existing systems.

Embodiments may further comprise: generating API usage information based on the determined dependency between API calls, wherein the API usage information comprises information that is representative of how data flows between the API calls. Information may therefore be provided by embodiments, which is useful for gaining an improved understanding of API flows and potential opportunities for improving API provision.

An embodiment may further comprise: obtaining API call data for a second user; and analyzing the obtained API call data for the second user to determine at least one of: a refined dependency between API calls and an indication of accuracy. In this way, analysis of data from multiple uses may be combined in order to provide improved accuracy or certainty as to obtained information and results.

In some embodiments, the API request data may comprise information relating to at least one of: an originator (such as an actual user making an API request, or an actual user clicking a button in an application which make the API request); a gateway; a proxy server; a destination an identifier of a data field; a value of a data field; a structure; metadata; and a called method of an API request. Similarly, the API response data may comprise information relating to at least one of: an originator; a destination; an identifier of a data field; a value of a data field; a structure; status (e.g. success or failure); and a calling API request of an API response. A wide range of data may thus be analyzed so as to provide many different forms of information that may be beneficial for improving API flow understanding and/or provision.

Embodiments may be employed in a network component. For example, there may be provided a network component (such as switch module) comprising an API usage analysis component configured to implement a method according to an embodiment. Also, embodiments may be implemented in a server device. Such a server device may be a cloud-based server resource accessible via the Internet.

According to further embodiments of the invention there is herein provided a computer program product for analyzing application program interface (API) usage, the computer program product comprising a computer readable storage medium having program instructions embodied therewith, the program instructions executable by a processing unit to cause the processing unit to perform a method comprising: (i) obtaining API call data for a user, the API call data comprising for each of a plurality of API calls made by the user: API request data; and API response data; (ii) analyzing the API call data to identify a relationship between API request data and API response data of different API calls; and (iii) determining a dependency between API calls based on the identified relationship.

According to yet another aspect, there is provided a processing system comprising at least one processor and the computer program product according to one or more embodiments, wherein the at least one processor is configured to execute the computer program code of the computer program product.

The processing system may be configured to act as an API usage analysis component situated between an API consumer and an API provider. The processing system may be configured to implement a part of an off-premise platform, such as a cloud-based system or server.

The present invention analyzes API calls to identify data from a API response (of an API call) that is used (at least in part) for an API request (of another API call). The system may be configured and used by either a consumer or provider of the APIs to identify linked API calls.

Thus, according to further embodiments of the invention, there is also herein provided a system for analyzing application program interface (API) usage, the system comprising: (i) a data collection unit configured to obtain API call data for a user, the API call data comprising for each API call of a plurality of API calls made by the user: API request data; and API response data; (ii) a data analysis unit configured to analyze the API call data to identify a relationship between API request data and API response data of different API calls; and (iii) a data processing unit configured to determine a dependency between API calls based on the identified relationship.

Embodiments may therefore provide a system which enables automated service generation or suggestion.

In some embodiments, the data analysis unit may be configured to: determine if request data of an API call is based on response data of a preceding API call; and identify a relationship between API request data of the API call and API response data of the preceding API call based on the result of the determination.

The data analysis unit may be further configured to determine if request data of an API call comprises at least one of: an aggregation; a subset; a concatenation; a conversion; a translation; and a transformation of response data of a preceding API call.

In an embodiment, the data collection unit may be configured to intercept API traffic between an API consumer and an API provider, the API consumer being controlled by the user to make the plurality of API calls. Also, the data collection unit may be configured to: read API call data from the intercepted API traffic; store the read API call data in a data store; and forward the intercepted API traffic to its intended destination.

The data collection unit may be configured to intercept API traffic at either the API consumer or the API provider.

Embodiments may further comprise an output unit configured to generate API usage information based on the determined dependency between API calls, wherein the API usage information comprises information that is representative of how data flows between the API calls.

The data collection unit may be further configured to obtain API call data for a second user, and the data analysis unit may be configured to analyze the obtained API call data for the second user to determine at least one of: a refined dependency between API calls; and an indication of accuracy.

In an embodiment, the API request data may comprise information relating to at least one of: an originator; a destination; an identifier of a data field; a value of a data field; a structure; and a called method of an API request. Similarly, the API response data may comprise information relating to at least one of: an originator; a destination; an identifier of a data field; a value of a data field; a structure; and a calling API request of an API response.

In the context of the present application, where embodiments of the present invention constitute a method, it should be understood that such a method is a process for execution by a computer; i.e., the process is a computer-implementable method. The various steps of the method therefore reflect various parts of a computer program; e.g., various parts of one or more algorithms.

Also, in the context of the present application, a (processing) system may be a single device or a collection of distributed devices that are configured to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The illustrative embodiments provide concepts for analyzing API usage patterns or data flow. Put another way, the present invention determines data dependencies between API flows or endpoints so as to provide information for improving API usage, implementation or design. Such dependencies may be determined by identifying a relationship between data of an API response from an API call and data of an API request of another (e.g., subsequent or later) API call. Such a relationship may be identified by determining if and how data of an API response has been used for an API request of a different API call. Thus, embodiments of the present invention may look for where API response data has been transposed, translated, concatenated, truncated, converted, processed or copied in order to provide data for another API request. Such an approach may enable improved understanding of API dataflow and how APIs are linked, thereby providing opportunities for improving API development or deployment.

Embodiments of the present invention therefore analyzes data usage across different API calls to identify where data output from one call is used for an input of another call.

Illustrative embodiments may therefore analyze API usage and dataflow between API providers and API consumers. Such analysis may take place at an API provider, an API consumer, or anywhere therebetween. Dynamic distributed API usage analysis may therefore be provided by embodiments of the present invention.

Modifications and additional steps to a traditional API implementation may also be implemented, which may enhance the value and utility of embodiments of the present invention.

Figure 1:
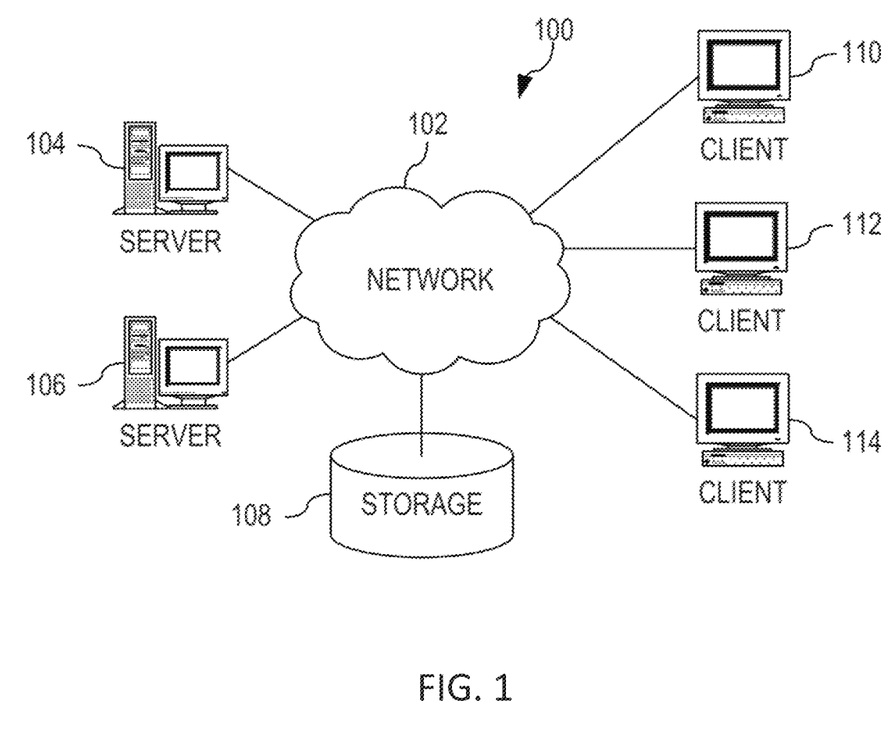
FIG. 1 depicts a pictorial representation of an example distributed data processing system in which aspects of illustrative embodiments of the present invention may be implemented.
Figure 2:
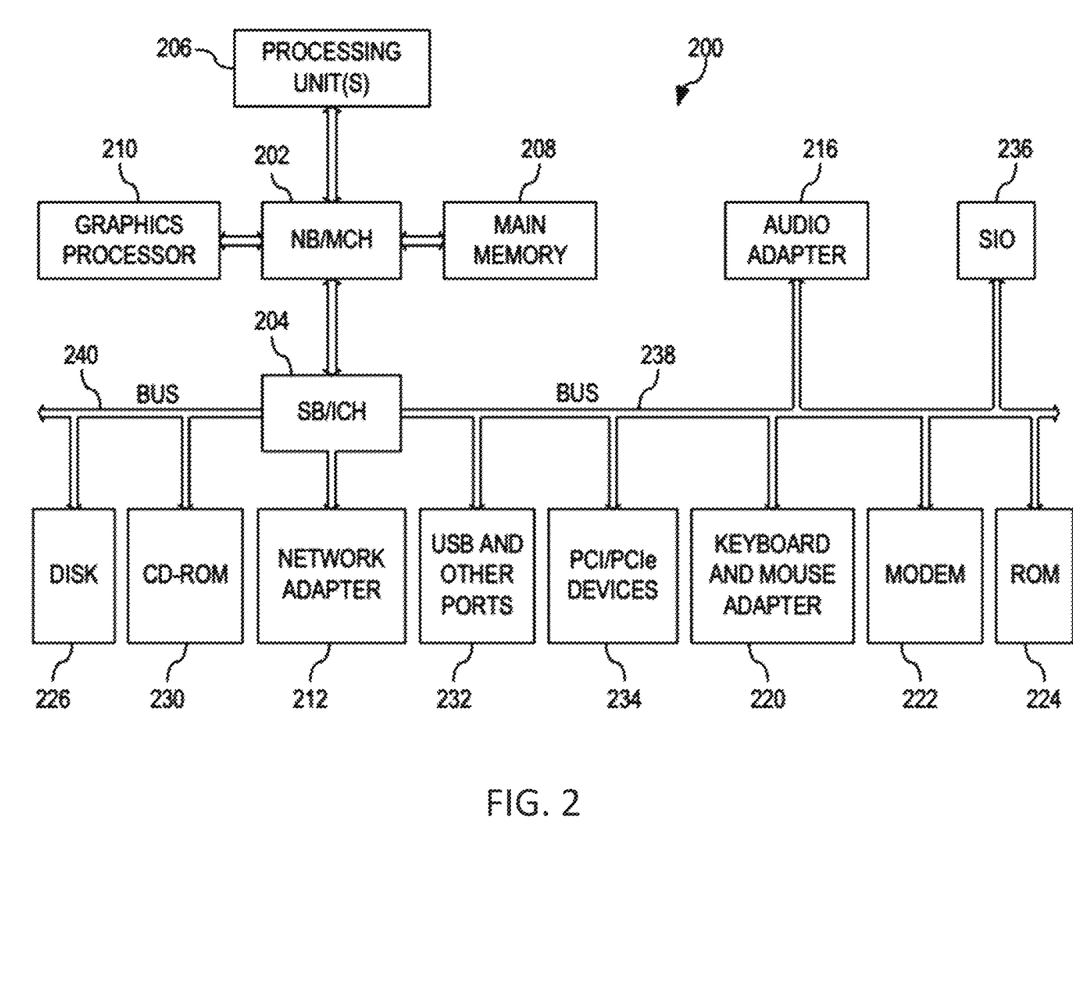
FIG. 2 is a block diagram of an example data processing system which aspects of illustrative embodiments of the present invention be implemented.

Illustrative embodiments may be utilized in many different types of data processing environments. In order to provide a context for the description of elements and functionality of the illustrative embodiments, FIGS. 1 and 2 are provided hereafter as example environments in which aspects of the illustrated embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of illustrative embodiments of the present invention may be implemented. Distributed data processing system 100 may include a network of computers in which aspects of the illustrative embodiments may be implemented. The distributed data processing system 100 contains at least one network 102, which is a medium used to provide communication links between various devices and computers connected together within distributed data processing system 100. The network 102 may include connections, such as wire, wireless communication links, or fiber optic cables.

In the depicted example, a first server 104 and a second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed data processing system 100 may include additional servers, clients, and other devices not shown.

In the depicted example, the distributed data processing system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. The distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system (or computer system) 200 in which aspects of illustrative embodiments of the present invention may be implemented. The data processing system 200 is an example of a computer or computer system, such as client 110 in FIG. 1, in which computer usable code or instructions implementing the processes for illustrative embodiments of the present invention may be located.

In the depicted example, the data processing system 200 employs a hub architecture including a north bridge and memory controller hub (NB/MCH) 202 and a south bridge and input/output (I/O) controller hub (SB/ICH) 204. One or more processing units 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers, PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on the processing unit 206. The operating system coordinates and provides control of various components within the data processing system 200 in FIG. 2. As a client, the operating system may be a commercially available operating system. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. The data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. Similarly, one or data structures according to an embodiment may be configured to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as first bus 238 or second bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG.

Those of ordinary skill in the art appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to multiprocessor/server systems, other than those illustrated, without departing from the scope of the proposed concepts.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, the data processing system 200 may be a portable computing device that is configured with flash memory to provide non-volatile memory for storing operating system files and/or user-generated data, for example. Thus, the data processing system 200 may essentially be any known or later-developed data processing system without architectural limitation.

The present invention may enhance a data processing system (such as the data processing system 200 depicted in FIG. 2) by providing for the identification of dependencies between API calls. Embodiments may enable the identification of data that is extracted from the output of one API call and used (e.g., with or without modification, or in combination with other data) for generating the input of another API call. Information may then be presented to API provider in order to facilitate improved understanding or design of API calls.

In particular, the present invention analyzes data of API requests and API responses so as to identify a relationship between API request data and API response data of one or more different API calls. Using such analysis, embodiments may employ the concept of determining data flows between API invocations (e.g. in an order identify how data from one API call may be used to define or generate another API call). Also, embodiments of the present invention may be able to handle nested invocation structures where further API calls made within a called API.

Figure 3:
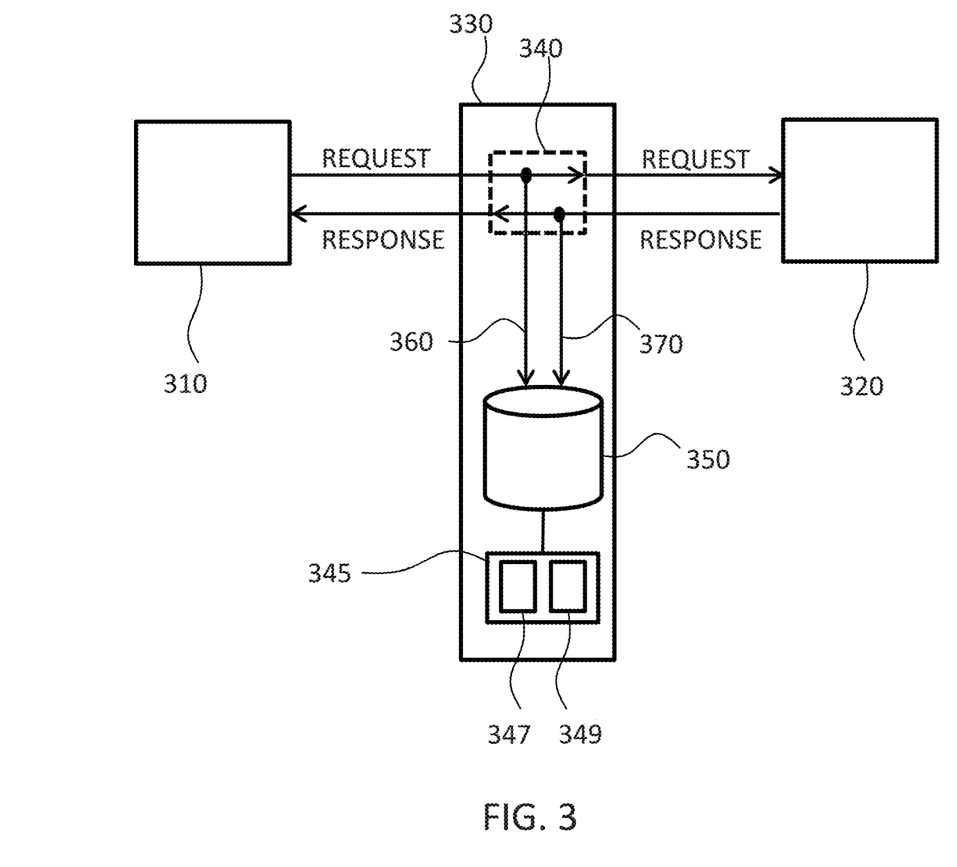
FIG. 3 is a schematic block diagram of a system according to embodiments of the present invention.

FIG. 3 is a schematic block diagram of a system 330 according to embodiments of the present invention. In FIG. 3, the system 330 for analyzing API usage may be situated between an API consumer 310 and an API provider 320. The system 330 may comprise a data collection unit 340, a processor arrangement 345 (which comprises a data analysis unit 347 and a data processing unit 349). In this example, the system 330 may also comprise a data store 350 configured to store data obtained by the data collection unit 340.

The data collection unit 340 may be configured to obtain API call data caused by a user controlling the API consumer 310. Here, the data collection unit 340 may intercept all API requests sent by the API consumer 310 and extract data 360 from the API requests so as to obtain API request data 360 for each API call made by the user (via the API consumer 310). The obtained API request data 360 may be passed to the data store 350 for storage. The data collection unit 340 may also intercept all API responses sent by the API provider 320 and extract data from the API responses so as to obtain API response data 370 for each API call made by the user (via the API consumer 310). The obtained API response data 370 may be passed to the data store 350 for storage. Thus, the obtained API call data may comprise, for each API call of a plurality of API calls made by the user: API request data 360; and API response data 370.

By way of example, obtained API request data 360 may comprise information relating to at least one of: an originator (such as an actual user making an API request, or an actual user clicking a button in an application which make the API request); a gateway; a proxy server; a destination; an identifier of a data field; a value of a data field; a structure; and a called method of a API request. Similarly, obtained API response data 370 may comprise information relating to at least one of: an originator; a destination; an identifier of a data field; a value of a data field; a structure; a status (e.g., success or failure); and a calling API request of an API response.

Thus, from the above description, it will be understood that the data collection unit 340 may be configured to read API call data from intercepted. API traffic between the API consumer 310 and API provider 320, to store the read API call data in a data store 350, and to forward the intercepted API traffic to its intended destination. By way of example, the data collection unit 340 may be implemented using an HTTP gateway or proxy which intercepts HTTP traffic between the API consumer 310 and API provider 320.

The data store 350 may store the obtained API request data 360 and obtained API response data 370 in a suitable data structure. For example, such a data structure may comprise: an ordered list; a table; a hierarchical structure; or a combination thereof. Also, the data store 350 may store additional information about the API consumer 310 (such as a unique identifier), for aiding identification of sequences of calls made by the API consumer 310 for example.

The processor arrangement 345 may be configured to access (e.g., read) API call data (e.g., API request data 360 and API response data 370) stored by the data store 350. For example, the processor arrangement 345 may be communicatively coupled to the data store 350 and implement one or more data store access algorithms, which enables stored data to be read from the data store 350. Using such access, the data analysis unit 347 of the processor arrangement may analyze the API call data stored by the data store so as to identify a relationship between API request data and API response data of different API calls.

By way of example, data analysis unit 347 may be configured to determine if request data of an API call is based on response data of a preceding (or earlier) API call, and then to identify a relationship between API request data of the API call and API response data of the preceding (or earlier) API call based on the result of the determination. For instance, the data analysis unit 347 may be configured to determine if request data of an API call comprises at least one of: an aggregation; a subset; a concatenation; a conversion; a translation; and a transformation of response data of a preceding API call.

Based on a relationship identified by the data analysis unit 347, the data processing unit 349 may be configured to determine a dependency between API calls. For instance, if the data analysis unit 347 identifies multiple instances of data from an API response being used (e.g., in a converted or translated form) in a subsequent API request, the data processing unit 349 may use the identified relationships between API responses and subsequent API request to determine how the subsequent API requests are dependent on the related API responses, which may comprise determining how the data of an API response is used (e.g., converted or translated) for generating the subsequent, related API request(s).

Considering now an example using the embodiment similar to that of FIG. 3, a history of API calls made by different API consumers (as obtained by the data collection unit 340 and stored in an ordered list in data store 350) may be as follows:

Consumer 1->method1( )
Consumer 2->method4( )
Consumer 3->method6( )
Consumer 1->method2( )
Consumer 2->method1( )
Consumer 3->method5( )
Consumer 1->method3( )
Consumer 2->method2( )
Consumer 2->method3( )
Consumer 2->method7( )

The above ordered history of calls may be split according to a consumer as follows:

Consumer 1->method1( )
Consumer 1->method2( )
Consumer 1->method3( )
And
Consumer 2->method4( )
Consumer 2->method1( )
Consumer 2->method2( )
Consumer 2->method 3( )
Consumer 2->method7( )

From the above split information, the data analysis unit 347 may identify that multiple API consumers have made the following API call sequence: method1( )->method2( )->method3( ). Next, the data analysis unit 347 may inspect the request and response data from this sequence in order to try and identify if and how data flows between the calls.

By way of example, the above sequence of calls may comprise the following data in one example:

method1( )
request: customer ID=5
response: name=Bob; country=GB
method2( )
request: code=GB
response: country=Great Britain
method 3( )
request: country=Great Britain
response: currency=GBP The preceding information can be identified by comparing the name, value, or structure of elements in the response of an API call with elements from the request to another API call.

For the above example, the data processing unit 349 can analyze the API call history data and the information identified by the data analysis unit 347 in order to determine the following information:

(i) API consumers are calling API call sequence: method1( )->method2( )->method3( )

(ii) API consumers calling the above sequence are passing the "country" from the response of method1( ) as the "code" in the request to method2( ); and (iii) API consumers calling the above sequence are passing the "country" form with the response of method2( ) as the "country" in the request to method3( ).

Based on the above findings, the data processing unit 349 can determine the inter-dependencies between method1, method2 and method3. Identification of such dependencies between API calls may be used to identify improvements and extensions to the existing APIs. For example, it may be decided that method1( ) should include the full country name of form method2( ) and that the currency of that country, since it may appear that most API consumer's request this information, which may be used to identify an opportunity to provide a new API that combines the other APIs. For instance, a new method, namely method4( ) may be defined which includes all of the information from method1, method2 and method3. Further, the information may be used to generate a reusable software library that provides a single API which calls the other APIs internally. For instance, the software library may provide a method5( ) call which calls the sequence method1( )->method2( )->method3( ).

Thus, it will be understood that, in the above-described example of FIG. 3, there may be provided a system 330 which sits in between (one or more) API consumers 310 and API provider 320 and which is configured to record calls made to provided APIs by the API consumer 310. The history of API calls may then be analyzed by the system 330 to identify repeating sequences of API calls made by API consumers. The repeated sequences of API calls may then be further inspected by the system 330 to identify data that is extracted from the output of one call and passed used to generate the input of another call. Identification of such data flow from a response of one call to a request of another call may then be used to determine a dependency between the calls. Information about the determined dependencies may then be presented (e.g., communicated to the API provider 320, for example) in order to provide numerous benefits including: an improved understanding of how consumers are using the APIs; the opportunity to identify improvements and extensions to the APIs; the opportunity to provide new APIs that combine the existing APIs; and/or the opportunity to generate a reusable software library that provides a single API which calls the existing APIs internally (or "under the covers").

Embodiments may therefore be thought of as employing a data-centric approach to analyzing API flow across API calls. By identifying and analyzing how data from a first API call may be used for a second API call, and insight into dataflow and/or how data is transformed between API calls may be obtained.

Figure 4:
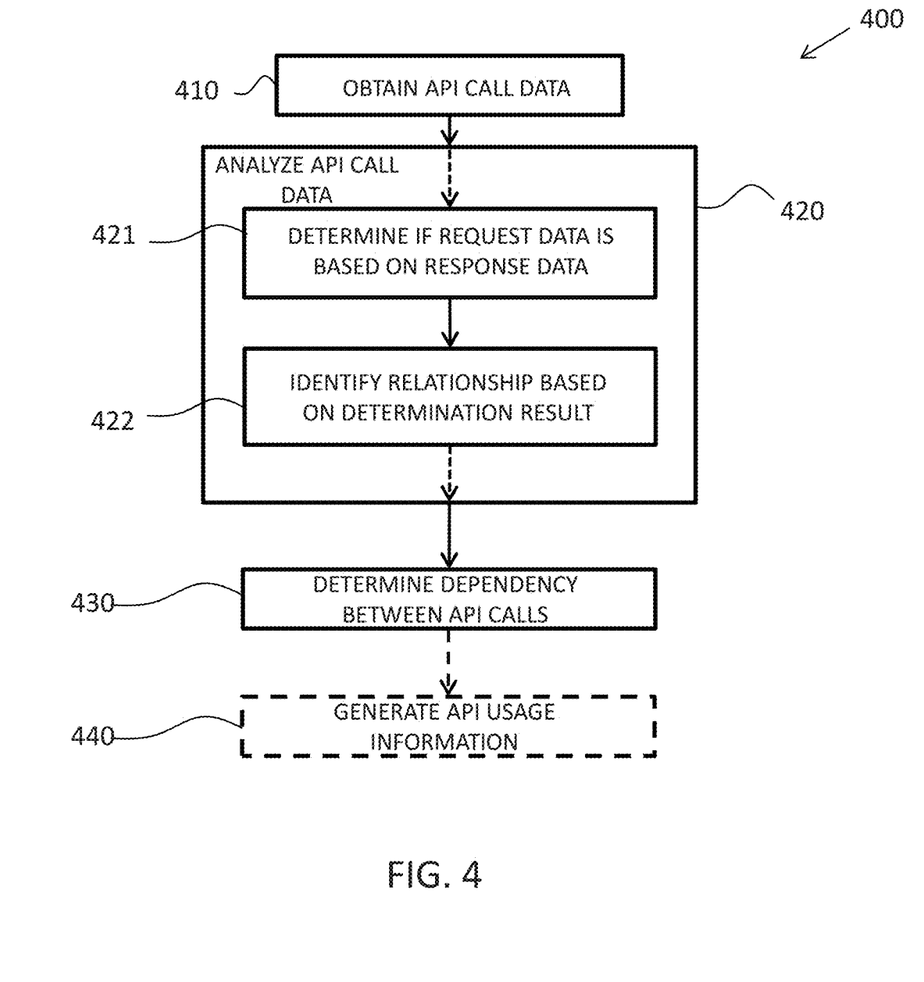
FIG. 4 is a flow diagram of an exemplary implementation of a computer-implemented method according to embodiments of the present invention.

FIG. 4 is a flow diagram of an exemplary implementation of a computer-implemented method 400 according to embodiment embodiments of the present invention.

The method 400 begins in step 410 with API call data being obtained. Here, the API call data may comprise, for each API call of a plurality of API calls made by a user (e.g., an API consumer), API request data and API response data. For example, API request data may comprise information relating to at least one of: an originator; a destination; an identifier of a data field; a value of a data field; a structure; and a called method of an API request. Similarly, the API response data may comprise information relating to at least one of: an originator; a destination; an identifier of a data field; a value of a data field; a structure; and a calling API request of an API response. Thus, it will be understood that a wide variety of data from API requests and responses may be obtained for the purpose of subsequent analysis, for example.

Purely by way of example, the step 410 of obtaining API call data may comprise: intercepting API traffic between an API consumer and an API provider. API call data may therefore be obtained in an unseen or undetectable manner, wherein data from API traffic is siphoned or mirrored for storage and subsequent analysis without the API traffic being modified or changed. For instance, a step of obtaining API call data may comprise: reading API call data from intercepted API traffic; storing the read API call data in a data store; and forwarding the intercepted API traffic to the API traffic's intended destination (without modifying or altering the API traffic, for example). Also, intercepting API traffic may be done at either an API consumer or API provider, or anywhere therebetween.

In step 420, the API call data is analyzed to identify a relationship between API request data and API response data of different API calls, By way of example, in the embodiment of FIG. 4, the step 420 of analyzing API call data may comprise: the step 421 of determining if request data of an API call is based on response data of a preceding or earlier API call; and then the step 422 of identifying a relationship between API request data of the API call and API response data of the preceding API call based on the result of the determination in step 421.

In more detail, and purely for explanatory purpose, the step 421 of determining if request data of an API call is based on response data of a preceding API call may comprise: determining if request data of an API call comprises at least one of: an aggregation; a subset; a concatenation; a conversion; a translation; and a transformation of response data of a preceding API call. Taking such an approach may identify cases where an API consumer has used data received from one API call for another API call, which may further identify how the data has been used, for example by identifying if the data has been changed in some way. For instance, it may be determined if a user has applied a basic string operation to a field of a response from one API call, such as converting field data to lower or upper case for example, before passing the modified field in a request of another API call. In another example, it may be determined that a user has concatenated two or more fields from one API call, such as combining the "first name" and "last name" fields into a single "full name field", before passing the combined field in a request of another API call.

Accordingly, the step 420 of analyzing request and response data of a sequence of API calls, may therefore identify cases where an API consumer is using response data from an API call for the purpose of generating or defining a request for another API call, which may also identify where response data from one API call determines which API call is subsequently invoked.

In step 430, a dependency between API calls may be determined based on the relationship(s) identified by step 420. For instance, if step 420 has identified multiple instances of data from an API response being used (e.g., in a converted or translated form) in a subsequent API request, the identified relationships between API responses and subsequent API request may be used to determine how the subsequent API requests are dependent on the related API responses, which may comprise determining how the data of an API response is used (e.g., converted, modified, copied or translated) for generating the subsequent, related API request(s).

As illustrated by the dashed box in FIG. 4, the method 400 may further comprise the step 440 of generating API usage information based on the determined dependency between API calls (from step 430) and improving API provision with respect to execution of an existing process, the improvement being based on utilization of the API usage information. The API usage information may comprise information that is representative of how data flows between the API calls. In this way, information may be provided which is useful for gaining an improved understanding of API flows and potential opportunities for improving API provision.

In one embodiment, improving API provision includes: for an executable process (e.g., method) that uses multiple APIs while being executed, (i) receiving (e.g., from a user) a specification of an improvement to be achieved for the process, (ii) generating a new API that combines a plurality of APIs selected from the multiple APIs, (iii) modifying the process by including the new API in the process and removing the plurality of APIs from the process, wherein the improvement may be achieved due to the new API in the modified process. The plurality of APIs are selected from the multiple APIs based on specifically what the specified improvement is. In one embodiment, the plurality of APIs consists of fewer APIs than the total number of APIs of the multiple APIs. In one embodiment, the plurality of APIs consists of all of the APIs of the multiple APIs.

The improvement for the process improves operation of the computer or computer system on which the process is stored and executed. In one embodiment, the improvement of the operation of the computer or computer system on which the process is stored and executed is achieved via one or more of the following features: reducing computer time (i.e., executing the modified process in less time than executing the process prior to being modified) by, for example, reducing the number of API calls; reducing network bandwidth (i.e., using less bandwidth during execution of the modified process than during execution of the process prior to being modified) by, for example, fetching fewer APIs from storage; and simplifying debugging and error analysis of the process by, for example, eliminating the number of interfaces, between APIs of the plurality of APIs, that would otherwise have to be monitored.

Also, embodiments may further comprise the step of obtaining API call data for a second user; and analyzing the obtained API call data for the second user to determine at least one of: a refined dependency between API calls; and an indication of accuracy. Such analysis of data from multiple uses provides improved accuracy or certainty in the obtained information and results.

In a basic use case, an illustrative method (such as that of FIG. 4) may identify data being passed "as-is" (i.e., unchanged) between a sequence of APIs. However, embodiment may be extended to identify more complex interactions between different API calls. By way of example only, embodiments may identify and determine: transformation of data; and/or aggregation of data when being passed from a response of one call to a request of another call.

Transformation of Data

By analyzing the request and response data of a sequence of API calls, rather than implementing a straight-forward comparison, embodiments may identify cases where the API consumer has transformed the data received from one API call before sending that transformed data to another API call. Identification of multiple instances of such transforms may enable the transformation(s) to be determined, for example.

For instance, an embodiment may be arranged to identify if a user has applied basic string operations to fields in the response from one API call, such as combining, truncating or concatenating text, before passing the modified fields in the request for another API call. Embodiments may thus identify instances where a user has concatenated two or more fields from the response of one API call, such as combining the "firstname" and "lastname" fields into a single "fullname field", before passing the combined field in the request to another API call. Thus, it will be appreciated that this approach may enable determination of a description of the data transformation (e.g., combining field 1 and field 2 of a response) used to form an input for a subsequent request of an API call.

Aggregation of Data

By analyzing the request and response data of a sequence of (e.g., three or more) API calls, embodiments may identify cases where the API consumer is taking response data from multiple API calls, and combining data from all of those response calls into a request to another API call.

For example, given a retail order from a particular customer, an API consumer may make the following API calls as part of the processing for that order:
  getCustomerDetails( )
  getCurrentPromotions( )
  getStockLevels( )

After receiving the responses from the three API calls above, the API consumer may combine data from all of those three API calls into a single executeOrder( ) API call.

Embodiments may identify the first three API calls being made, and determine which bits of data are retrieved from the responses to those three API calls and combined into the request for the final API call.

Sequencing of API Calls Based on Data

By analyzing the request and response data of a sequence of API calls, embodiments may identify scenarios where the response data from one API call by an API consumer determines which API call is invoked next.

For example, a credit card processing system may make an API call to runFraudChecks( ) This API call may analyze the credit card transaction and return a score (0-100) that predicts the chances of the transaction being fraudulent.

The API consumer will receive the score, and may use the score to determine the next API call. For example, the API consumer may call executeTransaction( ) if score<50, runAdditionalChecks( ) if score>=50 and score<80, or alertPolice( ) if score>=80.

Embodiments may identify the dependencies between such API calls, which is based on data of an earlier response.

Figure 5:
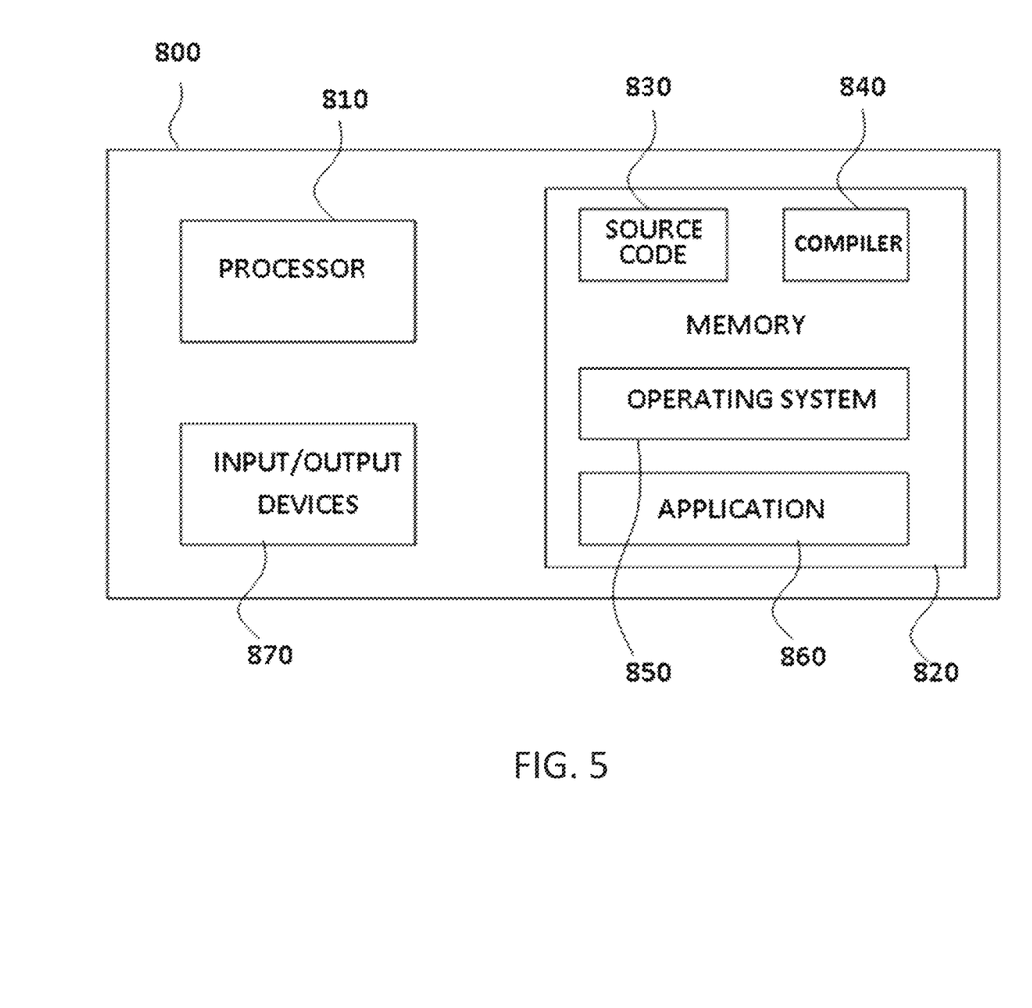
FIG. 5 illustrates an example of a computer within which embodiments of the present invention may be implemented.

FIG. 5 illustrates an example of a computer 800 within which embodiments of the present invention may be implemented. Various operations discussed above may utilize the capabilities of the computer 800. For example, one or more parts of a system for analyzing API usage may be incorporated in any element, module, application, and/or component discussed herein. In one embodiment, the data processing system/computer system 200 of FIG. 2 may comprise the computer 800.

The computer 800 includes, but is not limited to, PCs, workstations, laptops, PDAs, palm devices, servers, storages, and the like. Generally, in terms of hardware architecture, the computer 800 may include one or more processors 810, memory 820, and one or more I/O devices 870 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 810 is a hardware device for executing software that can be stored in the memory 820. The processor 810 can be virtually any custom made or commercially available processor, a central processing unit (CPU), a digital signal processor (DSP), or an auxiliary processor among several processors associated with the computer 800, and the processor 810 may be a semiconductor based microprocessor (in the form of a microchip) or a microprocessor.

The memory 820 can include any one or combination of volatile memory elements (e.g., random access memory (RAM), such as dynamic random access memory (DRAM), static random access memory (SRAM), etc.) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 820 may incorporate electronic, magnetic, optical, and/or other types of storage media. Note that the memory 820 can have a distributed architecture, where various components are situated remote from one another, but can be accessed by the processor 810.

The software in the memory 820 may include one or more separate programs, each of which comprises an ordered listing of executable instructions for implementing logical functions. The software in the memory 820 includes a suitable operating system (O/S) 850, compiler 840, source code 830, and one or more applications 860 in accordance with exemplary embodiments. As illustrated, the application 860 comprises numerous functional components for implementing the features and operations of the exemplary embodiments. The application 860 of the computer 800 may represent various applications, computational units, logic, functional units, processes, operations, virtual entities, and/or modules in accordance with exemplary embodiments, but the application 860 is not meant to be a limitation.

The operating system 850 controls the execution of other computer programs, and provides scheduling, input-output control, file and data management, memory management, and communication control and related services. It is contemplated by the inventors that the application 860 for implementing exemplary embodiments may be applicable on all commercially available operating systems.

Application 860 may be a source program, executable program (object code), script, or any other entity comprising a set of instructions to be performed. When a source program, then the program is usually translated via a compiler (such as the compiler 840), assembler, interpreter, or the like, which may or may not be included in the memory 820, so as to operate properly in connection with the O/S 850. The I/O devices 870 may include input devices such as, for example but not limited to, a mouse, keyboard, scanner, microphone, camera, etc. Furthermore, the I/O devices 870 may also include output devices, for example but not limited to a printer, display, etc. Finally, the I/O devices 870 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 870 also include components for communicating over various networks, such as the Internet or intranet.

If the computer 800 is a PC, workstation, intelligent device or the like, the software in the memory 820 may further include a basic input output system (BIOS) (omitted for simplicity). The BIOS is a set of essential software routines that initialize and test hardware at startup, start the O/S 850, and support the transfer of data among the hardware devices. The BIOS is stored in some type of read-only-memory, such as ROM, PROM, EPROM, EEPROM or the like, so that the BIOS can be executed when the computer 800 is activated.

When the computer 800 is in operation, the processor 810 is configured to execute software stored within the memory 820, to communicate data to and from the memory 820, and to generally control operations of the computer 800 pursuant to the software. The application 860 and the O/S 850 are read, in whole or in part, by the processor 810, perhaps buffered within the processor 810, and then executed.

When the application 860 is implemented in software it should be noted that the application 860 can be stored on virtually any computer readable hardware storage medium or device for use by or in connection with any computer related system or method. In the context of this document, a computer readable hardware storage medium or device may be an electronic, magnetic, optical, or other physical device or means that can contain or store a computer program for use by or in connection with a computer related system or method.

The application 860 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of the present application, where embodiments of the present invention constitute a method, it should be understood that such a method is a process for execution by a computer; i.e., such a method is a computer-implementable method. The various steps of the method therefore reflect various parts of a computer program; e.g., various parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention may include one or more computer readable hardware storage devices having computer readable program code stored therein, said program code containing instructions executable by one or more processors of a computing system (or computer system) to implement the methods of the present invention.

A system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, said method comprising:
    analyzing, by one or more processors of a computer system, application programming interface (API) call data for a user to identify a relationship between API input data and API output data of two or more API calls to or from respective two or more APIs;
    generating, by the one or more processors, API usage information, said generating the API usage information utilizing a dependency between the two or more API calls, wherein the API usage information comprises information pertaining to how data flows between the two or more API calls; and
    improving API provision with respect to execution of a process that includes the two or more APIs, said improving API provision being based on utilization of the API usage information, said improving API provision comprising: receiving a specification of an improvement to be achieved for the process, selecting a plurality of APIs from the two or more APIs for achieving the improvement, generating a new API that combines the plurality of APIs into an API combination included in the new API, and modifying the process by including the new API in the process and removing the plurality of APIs from the process, wherein the improvement is achieved due to the new API in the modified process.

2. The method of claim 1, said method further comprising:
    prior to said generating the API usage information, determining, by the one or more processors, the dependency between the two or more API calls, based on the identified relationship.

3. The method of claim 1, wherein said analyzing comprises determining that input data of an API call is based on output data of a preceding API call and in response, identifying a relationship between the input data of the API call and the output data of the preceding API call.

4. The method of claim 3, wherein said determining that the input data of the API call is based on the output data of the preceding API call comprises: determining that the input data of the API call is selected from the group consisting of an aggregation, a subset, a concatenation, a conversion, a translation of the response data of the preceding API call, and combinations thereof.

5. The method of claim 1, wherein said obtaining API call data for the user comprises:
    intercepting API traffic between an API consumer and an API provider, said API consumer being controlled by the user to invoke the two or more API calls.

6. The method of claim 5, wherein said obtaining API call data for the user comprises:
    reading API call data from the intercepted API traffic;
    storing the read API call data in a data store; and
    forwarding the intercepted API traffic to the API traffic's intended destination.

7. The method of claim 5, wherein said intercepting API traffic is performed at either the API consumer or the API provider.

8. The method of claim 1, said method further comprising:
    obtaining, by the one or more processors, API call data for a second user; and
    analyzing, by the one or more processors, the obtained API call data for the second user to determine a refined dependency between the two or more API calls indication of accuracy of the obtained API call data for the second user.

9. A computer program product, comprising one or more computer readable hardware storage devices having computer readable program code stored therein, said program code containing instructions executable: by one or more processors of a computer system to implement a method, said method comprising:

analyzing, by one or more processors, application programming interface (API) call data for a user to identify a relationship between API input data and API output data of two or more API calls to or from respective two or more APIs;

generating, by the one or more processors, API usage information, said generating the API usage information utilizing a dependency between the two or more API calls, wherein the API usage information comprises information pertaining to how data flows between the two or more API calls; and     improving API provision with respect to execution of a process that includes the two or more APIs, said improving API provision being based on utilization of the API usage information, said improving API provision comprising: receiving a specification of an improvement to be achieved for the process, selecting a plurality of APIs from the two or more APIs for achieving the improvement, generating a new API that combines the plurality of APIs into an API combination included in the new API, and modifying the process by including the new API in the process and removing the plurality of APIs from the process, wherein the improvement is achieved due to the new API in the modified process.

10. The computer program product of claim 9, said method further comprising:

prior to said generating the API usage information, determining, by the one or more processors, the dependency between the two or more API calls, based on the identified relationship.

11. The computer program product of claim 9, wherein said analyzing comprises determining that input data of an API call is based on output data of a preceding API call and in response, identifying a relationship between the input data of the API call and the output data of the preceding API call.

12. The computer program product of claim 11, wherein said determining that the input data of the API call is based on the output data of the preceding API call comprises: determining that the input data of the API call is selected from the group consisting of an aggregation, a subset, a concatenation, a conversion, a translation of the response data of the preceding API call, and combinations thereof.

13. The computer program product of claim 9, wherein said obtaining API call data for the user comprises:

intercepting API traffic between an API consumer and an API provider, said API consumer being controlled by the user to invoke the two or more API calls.

14. The computer program product of claim 9, said method further comprising:

obtaining, by the one or more processors, API call data for a second user; and     analyzing, by the one or more processors, the obtained API call data for the second user to determine a refined dependency between the two or more API calls indication of accuracy of the obtained API call data for the second user.

15. A computer system, comprising one or more processors, one or more memories, and one or more computer readable hardware storage devices, said one or more hardware storage device containing program code executable by the one or more processors via the one or more memories to implement a method, said method comprising:

analyzing, by one or more processors, application programming interface (API) call data for a user to identify a relationship between API input data and API output data of two or more API calls to or from respective two or more APIs;

generating, by the one or more processors, API usage information, said generating the API usage information utilizing a dependency between the two or more API calls, wherein the API usage information comprises information pertaining to how data flows between the two or more API calls; and     improving API provision with respect to execution of a process that includes the two or more APIs, said improving API provision being based on utilization of the API usage information, said improving API provision comprising: receiving a specification of an improvement to be achieved for the process, selecting a plurality of APIs from the two or more APIs for achieving the improvement, generating a new API that combines the plurality f APIs into an API combination included in the new API, and modifying the process by including the new API in the process and removing the plurality of APIs from the process, wherein the improvement is achieved due to the new API in the modified process.

16. The computer system of claim 15, said method further comprising:

prior to said generating the API usage information, determining, by the one or more processors, the dependency between the two or more API calls, based on the identified relationship.

17. The computer system of claim 15, wherein said analyzing comprises determining that input data of an API call is based on output data of a preceding API call and in response, identifying a relationship between the input data of the API call and the output data of the preceding API call.

18. The computer system of claim 17, wherein said determining that the input data of the API call is based on the output data of the preceding API call comprises: determining that the input data of the API call is selected from the group consisting of an aggregation, a subset, a concatenation, a conversion, a translation of the response data of the preceding API call, and combinations thereof.

19. The computer system of claim 15, wherein said obtaining API call data for the user comprises:

intercepting API traffic between an API consumer and an API provider, said API consumer being controlled by the user to invoke the two or more API calls.

20. The computer system of claim 15, said method further comprising:

obtaining, by the one or more processors, API call data for a second user; and     analyzing, by the one or more processors, the obtained API call data for the second user to determine a refined dependency between the two or more API calls indication of accuracy of the obtained API call data for the second user.

* * * * *